(12) United States Patent
Ogata

(10) Patent No.: US 7,172,013 B2
(45) Date of Patent: Feb. 6, 2007

(54) BINDING STRUCTURE OF REFRACTORY SLEEVE FOR INNER HOLE OF NOZZLE FOR CONTINUOUS CASTING

(75) Inventor: Koji Ogata, Kitakyushu (JP)

(73) Assignees: Krosakiharima Corporation, Fukuoka (JP); LWB Refractories Company, York, PA (US)

( * ) Notice: Subject to any disclaimer, the term of this patent is extended or adjusted under 35 U.S.C. 154(b) by 0 days.

(21) Appl. No.: 10/509,638

(22) PCT Filed: Mar. 31, 2003

(86) PCT No.: PCT/JP03/04138

§ 371 (c)(1),
(2), (4) Date: Nov. 22, 2004

(87) PCT Pub. No.: WO03/086684

PCT Pub. Date: Oct. 23, 2003

(65) Prior Publication Data

US 2005/0067746 A1      Mar. 31, 2005

(30) Foreign Application Priority Data

Apr. 2, 2002   (JP) ............................. 2002-100366

(51) Int. Cl.
   B22D 11/10   (2006.01)
   B22D 41/54   (2006.01)
(52) U.S. Cl. ...................... 164/437; 222/591; 222/606
(58) Field of Classification Search ............... 164/437, 164/488; 222/591, 606

See application file for complete search history.

(56) References Cited

U.S. PATENT DOCUMENTS

| 4,568,007 A | * | 2/1986 | Fishler ........................ 222/606 |
| 4,691,844 A | * | 9/1987 | Ishino et al. ................... 222/59 |
| 5,100,035 A | * | 3/1992 | Dunworth et al. ........... 222/603 |
| 5,151,201 A | * | 9/1992 | Fishler et al. ............... 222/600 |
| 5,505,348 A | * | 4/1996 | Muroi et al. ................. 222/606 |

FOREIGN PATENT DOCUMENTS

JP        57-71860      *   5/1982

(Continued)

*Primary Examiner*—Kevin P. Kerns
(74) *Attorney, Agent, or Firm*—Jordan and Hamburg LLP

(57) ABSTRACT

A bonding structure between a nozzle body of a continuous casting nozzle and a refractory sleeve inserted into the nozzle body, wherein the refractory sleeve contains 20 mass % or more of CaO. An adhesive including a mixture of a refractory aggregate and a binder is applied to a joint zone defined in either one of at least a portion of the outer peripheral surface of the refractory sleeve and at least a portion of the inner surface of the hollowed nozzle to which the refractory sleeve is attached, or between the inner surface of the nozzle body and the outer peripheral surface of the refractory sleeve inserted into the nozzle body. The adhesive is adjusted to have a porosity in the range of 15 to 90% after dried in the joint zone. The bonding structure has a function of relaxing a thermal stress due to exponential expansion of the refractory sleeve caused by molten steel flowing into an inner hole of the nozzle during use, so as to prevent the detachment of the refractory sleeve and adverse affects on the nozzle body due to thermal expansion of the refractory sleeve.

4 Claims, 1 Drawing Sheet

FOREIGN PATENT DOCUMENTS

| | | | |
|---|---|---|---|
| JP | 62-024846 | | 2/1987 |
| JP | 62-24846 | * | 2/1987 |
| JP | 1-289549 | * | 11/1989 |
| JP | 2-23494 | | 5/1990 |
| JP | 3-81056 | * | 4/1991 |
| JP | 6-305844 | | 11/1994 |
| JP | 8-57601 | * | 3/1996 |
| JP | 8-283074 | * | 10/1996 |
| JP | 2003-40672 | | 2/2003 |

* cited by examiner

BINDING STRUCTURE OF REFRACTORY SLEEVE FOR INNER HOLE OF NOZZLE FOR CONTINUOUS CASTING

TECHNICAL FIELD

The present invention relates to the prevention of alumina deposit on the inner hole of a nozzle for use in continuous casting of steel, such as a submerged or immersion nozzle, upper nozzle, sliding nozzle, lower nozzle or long nozzle. In particular, the present invention relates to a bonding structure for a refractory sleeve defining the inner hole of such a nozzle to achieve that purpose.

BACKGROUND ART

A non-metallic inclusion in steel, such as alumina, which is deposited on the inner hole of an immersion nozzle during a steel continuous casting process, has adverse affects on the quality of a final product. In connection with strict quality recently required for steel products, a good deal of effort has been made to reduce the deposit of the non-metallic inclusion. Moreover, in the casting for long hours, the deposit on the inner hole of a nozzle, such as an immersion nozzle, causes clogging of the inner hole, which leads to difficulty in continuing the casting operation or deterioration in productivity.

Heretofore, in order to physically reduce the deposit such as alumina, argon gas has been injected from the inner surface of a nozzle into molten steel. In this technique, if the argon gas is injected at an excessive amount, resulting gas bubbles will be incorporated into slabs to cause the formation of pinholes in a mold or defect in a steel product. Thus, the gas has to be injected at a limited amount, and consequently an adequate effect cannot be always obtained.

There has also been known a technique for chemically reducing the deposit such as alumina, which is intended to provide a function of preventing alumina deposit (anti-alumina-deposit function) to a refractory material of an immersion nozzle. A typical refractory material according to the above technique is disclosed in Japanese Patent Publication No. 02-23494. This refractory material is based on CaO—$ZrO_2$-Graphite (hereinafter referred to as "ZCG") using CaO—$ZrO_2$ clinker which contains $CaZrO_3$ as a primary component, and the publication discloses the application of the ZCG-based material to the inner hole of an immersion nozzle.

Currently, the ZCG-base material has put into practical use only in a part of nozzles, but not come into general use. One of the reasons is in that if steel has a relatively large amount alumina inclusion, an adequate anti-alumina-deposit effect cannot be obtained. Thus, in such a case, it is required to take a measure of increasing the amount of CaO bringing out the anti-alumina-deposit effect, or of reducing the amount of carbon or graphite so as to increase the ratio of CaO to graphite. However, if the amount of CaO is increased, the ZCG-base material will inevitably have a larger thermal expansion coefficient. Thus, the material applied to the body of a nozzle is likely to cause thermal spalling. Even if the material is applied to only an inner hole portion of a nozzle, the body of the immersion nozzle will be likely to be pressed and cracked by the thermally expanded material.

Japanese Patent Laid-Open publication No. 62-24846 discloses a continuous casting nozzle having a cylindrical sleeve made of lime-based refractory material and inserted into the inner hole surface thereof, which exhibits excellent absorbability of alumina to prevent clogging of the inner hole thereof. As with the aforementioned publication, this nozzle has a problem of cracks of the nozzle body caused by expansion of the refractory sleeve due to a relatively large thermal expansion coefficient of the lime-based refractory material.

DISCLOSURE OF INVENTION

It is an object of the present invention to provide a bonding structure between a nozzle body of a continuous casting nozzle and a CaO-containing refractory sleeve inserted into the nozzle body to prevent alumina deposit, which is capable of preventing the expansion of the refractory sleeve from excreting adverse affects on the nozzle body.

It is another object of the present invention to provide a bonding structure capable of preventing the refractory sleeve attached to the nozzle body from being detached therefrom even if the refractory sleeve is thermally expanded.

It is still another object of the present invention to provide a continuous casting nozzle capable of effectively reducing alumina deposit and contributing to stable casting operation and improvement of slab quality.

In order to achieve the above object, in a process for bonding a refractory sleeve (hereinafter referred to as "sleeve"), which contains CaO highly effective in preventing alumina deposit, to the body of a continuous casting nozzle by use of an adhesive, the present invention is directed to adjust a porosity of a joint composed of the adhesive.

Specifically, the present invention provides a continuous casting nozzle including thereinside a refractory sleeve which contains 20 mass % or more of CaO. The nozzle comprised a joint formed by applying an adhesive to a joint zone defined in either one of at least a portion of the outer peripheral surface of the sleeve and at least a portion of the inner surface of a hollowed body of the nozzle to which the sleeve is attached, or between the inner surface of the body and the outer peripheral surface of the sleeve inserted into the body. The adhesive includes a mixture of a refractory aggregate and a binder. Further, the adhesive is adjusted to have a porosity in the range of 15 to 90% after dried in the joint zone.

While a continuous casting nozzle having a nozzle body and a CaO-containing refractory sleeve combined with the nozzle body may be prepared by integrally molding the sleeve and the nozzle body or by inserting the sleeve into the nozzle body and adhesively bonding them together, the adhesively bonded structure has a spalling resistance superior to that of the other structure. It is believed that the excellent spalling resistance comes from the adhesive joint having a function of absorbing or relaxing a thermal stress due to exponential expansion of the sleeve caused by molten steel flowing into the inner hole of the sleeve during use of the nozzle.

Through various researches on the material, structure and shape of a continuous casting nozzle, it has been found that the stress relaxation function can be obtained only if the adhesive joint has a porosity of 15% or more. If the adhesive joint has a porosity of less than 15%, its ability of relaxing thermal stress will be undesirably deteriorated to cause the risk of cracks in the nozzle body due to the thermal stress. On the other hand, an excessively high porosity causes problems, such as detachment of a part of the sleeve due to insufficient bonding force. In view of a fact that the expanded refractory sleeve during use is approximately in close contact with the nozzle body, a practicable range of the porosity is 90% or less, particularly preferably in the range of 30 to 75%.

The porosity in the present invention can be calculated based on a true specific gravity of the adhesive and a volume of the joint zone to be defined between the nozzle body and the sleeve, which are measured in advance, and a weight of the adhesive to be used as the joint or to be filled in the joint zone.

The adhesive to be used in the present invention may be a mortar type in which a refractory aggregate is dispersed over a liquid binder dissolved in a solvent, or a dry type in which phenol resin is coated on a refractory aggregate. Typically, after such an adhesive is applied to the joint zone, it is subjected to a drying process for removing the solvent or curing the phenol resin. As used in the specification, the term "porosity" means a porosity after the adhesive is dried or subjected to the drying process. Preferably, the refractory aggregate to be used in the adhesive has a particle size of 0.5 mm or less. Further, the porosity may be adjusted by changing an amount of the solvent and binder, or a filled amount of the adhesive.

The adhesive may be applied to at least a portion of the outer peripheral surface of the sleeve, or at least a portion of the inner surface of the hollowed nozzle body to which the sleeve is attached, through brushing, spraying or the like. Alternatively, a tape-shaped member impregnated with the adhesive may be wound around such a joint zone, for example, at least a portion of the outer peripheral surface of the sleeve. Alternatively, depending on the thickness of the joint, or if the joint is set to have a relatively large thickness, the adhesive joint may be formed by filling the adhesive in a joint zone defined between the inner surface of the hollowed nozzle body and the outer peripheral surface of the sleeve after inserted into the nozzle body.

In case where the sleeve containing 20 mass % or more is adhesively bonded to the nozzle body, it is desired to select the component of the refractory aggregate for the adhesive in consideration of the reactivity with CaO. Specifically, $SiO_2$ or $Al_2O_3$ reacts with CaO in a high-temperature range due to heat of molten steel to create a low-nelting-point substance. Thus, if a refractory aggregate containing such a component is partly used, it is required to take account of the amount of the component carefully. By contrast, MgO, CaO or $ZrO_2$ has a low reactivity with CaO, and therefore creates only a small amount of low-melting-point substance. Thus, it is preferable to use a refractory aggregate containing one of MgO, CaO and $ZrO_2$ or their compound as a primary component.

In view of a handling performance and/or a cost performance, an MgO-containing refractory aggregate is particularly preferable. For example, a mortar-type adhesive contains MgO as a primary component, 70 mass % or more of the refractory aggregate is formed by using a magnesian material such as sintered magnesia, calcinated magnesia or fused magnesia. In order to prevent a fusion damage due to thermal load from molten steel from occurring, it is preferable to use MgO having a purity of 95% or more, or CaO or $ZrO_2$ low in impure components, such as $SiO_2$ or $Al_2O_3$.

In case of combinationally using a refractory aggregate containing MgO as a primary component, and 30 mass % or less of one or more substances including alumina and/or aluminum in the form of $Al_2O_3$, a spinel is created due to thermal load from molten steel. Then, due to expansion of the aggregate in connection with the creation of the spinel, the porosity of the joint is reduced, and the bonding strength between the nozzle body and the sleeve is increased. The creation of the spinel has no adverse affect on spalling likely to occur at the initiation of the pouring of molten steel because the spinel is gradually created after a thermal stress generated at the initiation of the pouring is relaxed. However, if the substances to be combined in the form of $Al_2O_3$ become greater than 30 mass %, a low-melting-point substance will be undesirably created at a large amount through the reaction with CaO contained in the sleeve.

While the thickness of the joint is not limited to a specific value, it is preferably set in the range of 0.5 to 2.5 mm in view of the stress relaxation and bonding functions of the joint. In case where the thickness of the joint is set at a relatively small value, it is preferable to set the porosity of the joint at a relatively large value so as to provide an enhanced stress relaxation function. In case where the thickness of the joint is set at a relatively large value, it is preferable to set the porosity of the joint at a relatively small value so as to provide an enhanced bonding function.

BEST MODE FOR CARRYING OUT THE INVENTION

Figure 1:
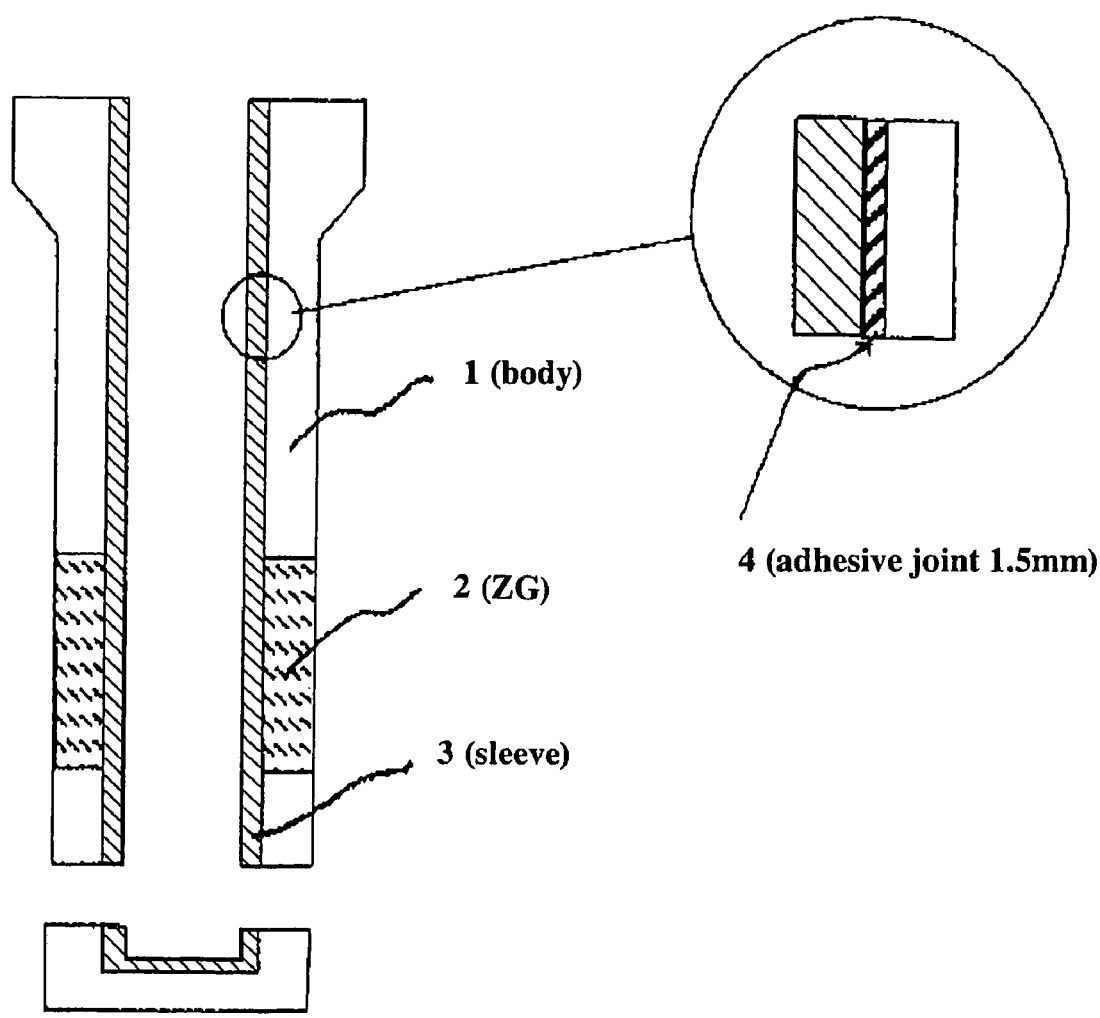
FIG. 1 shows an immersion nozzle according to one embodiment of the present invention.

In an immersion nozzle illustrated in FIG. 1, the reference numerals 1, 2, 3 and 4 indicates a nozzle body, a ZG composition used on a slag line, a sleeve, and an adhesive joint, respectively.

A to F in the following Table 1 indicates examples of a composition for use in each portion of the immersion nozzle.

TABLE 1

| Type of Composition | | A | B | C | D | E | F |
|---|---|---|---|---|---|---|---|
| Compounding | C | 25 | 25 | 20 | — | 25 | — |
| Ratio | $Al_2O_3$ | 75 | — | — | — | — | — |
| (mass %) | MgO | — | 75 | — | — | 35 | 40 |
| | $ZrO_2$ | — | — | 60 | 70 | — | — |
| | CaO | — | — | 20 | 30 | 40 | 60 |

TABLE 2

| | Comparative Example | Inventive Example | | | | | | |
|---|---|---|---|---|---|---|---|---|
| | 1 | 1 | 2 | 3 | 4 | 5 | 6 | 7 |
| Material of Body | A | A | A | A | A | A | A | A |
| Material of Sleeve | C | C | C | C | C | C | C | C |
| Porosity of Joint | 10 | 15 | 20 | 30 | 45 | 60 | 75 | 90 |

TABLE 2-continued

| | | | | | | | | | | |
|---|---|---|---|---|---|---|---|---|---|---|
| Spalling Test | Cracks in Body | X | ○ | ○ | ○ | ○ | ○ | ○ | ○ | ○ |
| | Detachment of sleeve | ○ | | ○ | ○ | ○ | ○ | ○ | ○ | ○ |

| | Comparative Example | Inventive Example | | | | | | | Comparative Example |
|---|---|---|---|---|---|---|---|---|---|
| | 2 | 3 | 8 | 9 | 10 | 11 | 12 | 13 | 14 | 4 |
| Material of Body | A | A | A | A | A | A | A | A | A | A |
| Material of Sleeve | C | D | D | D | D | D | D | D | D | D |
| Porosity of Joint | 95 | 10 | 15 | 20 | 30 | 45 | 60 | 75 | 90 | 95 |
| Spalling Test Cracks in Body | ○ | X | Δ | ○ | ○ | ○ | ○ | ○ | ○ | ○ |
| Detachment of sleeve | X | ○ | ○ | ○ | ○ | ○ | ○ | ○ | ○ | X |

In the test result,
○: no defect,
Δ: occurrence of minor defect,
X: occurrence of serious defect

TABLE 3

| | Comparative Example | Inventive Example | | | | | | |
|---|---|---|---|---|---|---|---|---|
| | 5 | 15 | 16 | 17 | 18 | 19 | 20 | 21 |
| Material of Body | B | B | B | B | B | B | B | B |
| Material of Sleeve | E | E | E | E | E | E | E | E |
| Porosity of Joint | 10 | 15 | 20 | 30 | 45 | 60 | 75 | 90 |
| Spalling Test Cracks in Body | X | Δ | ○ | ○ | ○ | ○ | ○ | ○ |
| Detachment of sleeve | ○ | ○ | ○ | ○ | ○ | ○ | ○ | Δ |

| | Comparative Example | | Inventive Example | | | | | | | Comparative Example |
|---|---|---|---|---|---|---|---|---|---|---|
| | 6 | 7 | 22 | 23 | 24 | 25 | 26 | 27 | 28 | 8 |
| Material of Body | B | B | B | B | B | B | B | B | B | B |
| Material of Sleeve | E | F | F | F | F | F | F | F | F | F |
| Porosity of Joint | 95 | 10 | 15 | 20 | 30 | 45 | 60 | 75 | 90 | 95 |
| Spalling Test Cracks in Body | ○ | X | Δ | ○ | ○ | ○ | ○ | ○ | ○ | ○ |
| Detachment of sleeve | X | ○ | ○ | ○ | ○ | ○ | ○ | Δ | ○ | X |

In the test result,
○: no defect,
Δ: occurrence of minor defect,
X: occurrence of serious defect The compositions A to F as shown in Table 1 were combined as shown in Tables 2 and 3 to prepare immersion nozzles with the structure as shown in FIG. 1. In these examples, the ZG composition used on the slag line was commonly made of a material containing 16 mass % of FC, 80 mass % of $ZrO_2$ and 4 mass % of CaO. The adhesive joint 4 between the nozzle body 1 and the sleeve 3 was set to have a thickness of 1.5 mm, and the porosity of the joint was adjusted by changing a filled amount of the adhesive. A mortar comprising 10 weight parts of novolak-type phenol resin, 1 weight part of hexamine and 10 weight parts of ethanol with respect to 100 weight parts of MgO aggregate was used as the adhesive.

A spalling test was performed while pouring molten steel having a temperature of 1550° C. to each of these samples or immersion nozzles to evaluate the occurrence of cracks in the nozzle body and detachment of the sleeve. The sample having no defect, the sample having a minor defect and the sample having a serious defect were represented by the marks ○, Δ and x, respectively.

As seen in Tables 2 and 3, if the porosity of the joint is set in the range of 15 to 90%, the example had an adequate result of the spalling test, or had no or minor defects concerning the cracks in the nozzle body and the detachment of the sleeve.

INDUSTRIAL APPLICABILITY

The present invention is applicable to a metal casting nozzle, particularly to various regions of an inner hole of a nozzle for use in continuous casting of steel, such as a submerged or immersion nozzle, upper nozzle, sliding nozzle, lower nozzle or long nozzle, onto which alumina is likely to be deposited.

What is claimed is:

1. A bonding structure for a refractory sleeve attached to an inside of a continuous casting nozzle, said sleeve defining an inner hole of said nozzle, wherein said sleeve comprises 20 mass % or more of CaO;

said bonding structure comprises a joint formed by applying an adhesive to a joint zone defined by either one of at least a portion of an outer peripheral surface of said sleeve or an inner surface of a hollowed body of said nozzle to which said sleeve is attached, or defined by an inner surface between said hollowed body and an outer peripheral surface of said sleeve inserted into said hollowed body;

said adhesive comprises a mixture of a refractory aggregate containing 70 mass % or more of MgO as a primary component, said MgO having a particle size of 0.5 mm or less and a purity of 95% or more; and said adhesive has a porosity of 30 to 75% after drying.

2. The bonding structure according to claim 1, wherein said adhesive comprises 30 mass % or less of alumina in the form of $Al_2O_3$.

3. A bonding structure for a refractory sleeve attached to an inside of a continuous casting nozzle, said sleeve defining an inner hole of said nozzle, wherein said sleeve comprises 20 mass % or more of CaO;

said bonding structure comprises a joint formed by applying an adhesive to a joint zone defined by either one of at least a portion of an outer peripheral surface of said sleeve or an inner surface of a hollowed body of said nozzle to which said sleeve is attached;

said adhesive comprises a mixture of a refractory aggregate containing 70 mass % or more of MgO as a primary component, said MgO having a particle size of 0.5 mm or less and a purity of 95% or more; and said adhesive has a porosity of 30 to 75% after drying.

4. A bonding structure for a refractory sleeve attached to an inside of a continuous casting nozzle, said sleeve defining an inner hole of said nozzle, wherein said sleeve comprises 20 mass % or more of CaO;

said bonding structure comprises a joint formed by applying an adhesive to a joint zone defined by an inner surface between said hollowed body and an outer peripheral surface of said sleeve inserted into said hollowed body;

said adhesive comprises a mixture of a refractory aggregate containing 70 mass % or more of MgO as a primary component, said MgO having a particle size of 0.5mm or less and a purity of 95% or more; and said adhesive has a porosity of 30 to 75% after drying.

* * * * *